Figure 1:
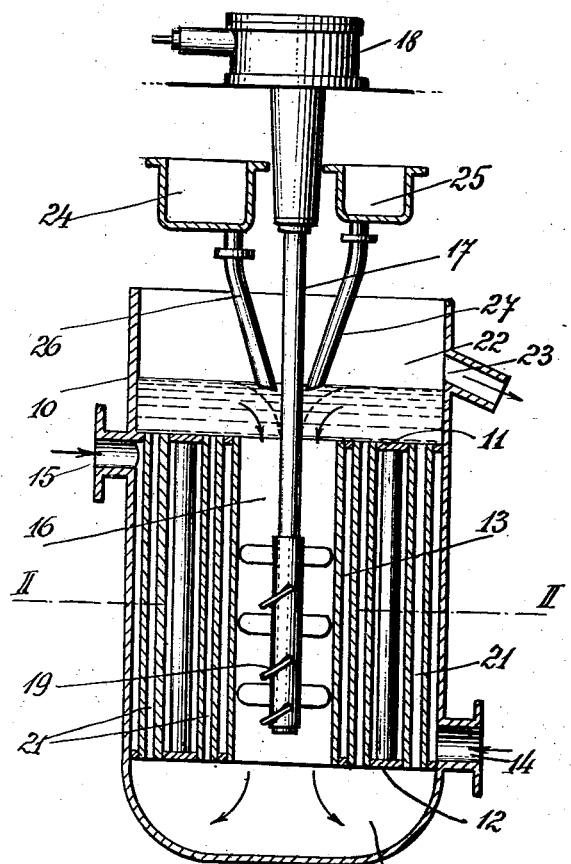

April 5, 1938.   J. HELLE ET AL   2,112,989
PROCESS FOR THE NITRATION OF STARCH
Filed Nov. 10, 1936

INVENTORS
Johann Helle
Alfons Kunz
BY Albert F. Nathan
ATTORNEY

Patented Apr. 5, 1938

2,112,989

UNITED STATES PATENT OFFICE

2,112,989

PROCESS FOR THE NITRATION OF STARCH

Johann Helle and Alfons Kunz, Fuzfo, Hungary, assignors to Nitrokémia Ipartelepek Részvénytársaság, Budapest, Hungary, a Hungarian company Application November 10, 1936, Serial No. 110,188
In Hungary May 22, 1936

4 Claims. (Cl. 260—145)

This invention relates to the nitration of starch and it is an object of the invention to produce a product which is uniformly nitrated throughout and which is easily filterable and consequently easily separated from the spent acid, and furthermore a product which is easily stabilized.

Different processes for the nitration of starch are already known. Concentrated nitric acid or a mixture of nitric and sulphuric acids (the so-called mixed acid) is used for the nitration. The nitration process itself has been carried out at various temperatures between minus 10° C. up to plus 20 to 25° C. and even higher temperatures. Mixed acids have been used in which the ratio of nitric to sulphuric acid has been 1:1 or 1:2 and in this case lower temperatures are employed. Processes are also known in which a mixed acid is used which contains more than 50% nitric acid in which temperatures of 10 to 20° C. are employed. The ratio between the starch and the acid used for nitrating was 1:10 and even more.

The fundamental conditions for obtaining a good nitro-starch is a uniform nitration, i. e. each starch particle must so far as possible have the same nitrogen content; it is further desirable that the nitro-starch should be easily stabilizable because uniform and stable explosives can only be made from such nitro-starches with any degree of reliability.

The principle of the invention consists in the realization of each of the conditions which are necessary to be complied with for the preparation of such a nitro-starch.

According to the invention there is employed for the nitration of the starch a mixed acid with a content of 70 to 90% HNO$_3$ and the temperature is maintained during the nitration below plus 5° C. The result is very satisfactory if a mixed acid is used which contains 75 to 85% HNO$_3$ and 25 to 15% H$_2$SO$_4$ and a temperature of approximately minus 5° C. is maintained. Under these conditions a water content of 1 to 2% in the acid employed for the nitration does not adversely affect the good results.

We have found that an easily filterable reaction mixture is obtained if 4 to 6 parts by weight of the nitrating acid are used for one part by weight of the dry starch. The spent acid can be commercially recovered from this reaction mixture and the nitrated product can be further worked up under favourable conditions.

Well-dried starch in powder form is employed with advantage for the nitration and provision should be made for the introduction of the starch into the mixed acid, and during the nitration precautions taken to ensure that the starch retains as far as possible its well-powdered condition by thorough stirring during the entire nitration operation. It is important to avoid the formation of lumps or at least to reduce such formation to a minimum because these lumps have an adverse effect on the quality of the product.

A process is known in which nitration is effected with a mixed acid containing a high proportion of nitric acid at temperatures of 10 to 15° C. or at higher temperatures. Under these conditions, the starch goes partly into solution, the yield is adversely affected, the product is difficult to filter and has a tendency to become pasty, and is not easy to stabilize. It is also known to use a mixed acid containing more than 50% sulphuric acid in which also higher temperatures are employed. This process has also the above-mentioned disadvantages. On this account, attempts have been made to work at lower temperatures down to about 0° C. In this case difficulties are met with in that the product produced from such mixed acids contains a high proportion of sulphuric acid, is very difficult to stabilize although it neither becomes pasty nor does the starch go into solution. Such a mixed acid yields a powdery product which is very difficult to filter and the further working up of which is attended with difficulties.

If the ratio between the amounts of starch and nitrating acid is 1:4-6, preferably 1:4-5, in the process of the invention then a thin pulpy mass is obtained from which the nitrating acid can be easily separated. Such a reaction mixture can, in fact, filter of itself. If, however, the reaction mixture is thinner, then the fine starch particles which separate from the coarser stop up the filter; washing out of the starch and recovery of the nitrating acid are then more difficult and a very dilute spent acid is obtained. With regard to the two commercial considerations, it is particularly important that the above-mentioned proportions should be adhered to.

The thorough stirring of the mixture during the nitration inhibits the formation of lumps. The nitration of such lumpy starch is only carried out under very unsuitable conditions, because the nitrating acid does not work uniformly on the entire mass of the starch. The concentration of the acid in each lump alters locally on account of the using-up of the nitric acid during the reaction and also on account of the water freed as a result of the reaction. The composition of the nitrating acid becomes unsuitable for the preparation of a well nitrated starch and undergoes in consequence of the reaction local heating. The result of working with such an acid is that the acid instead of nitrating the starch partly decomposes it, and there is obtained not only a product which is nitrated to a different extent in different parts, but also which is difficult to stabilize. Furthermore, the yield is adversely affected and the elimination of acid is difficult to carry out on account of difficult filtration, and there is obtained a large amount of dilute spent acid which can only be recovered at considerable cost.

According to the invention the nitration is further carried out in continuous operation in which on the one hand the starch, and on the other hand the mixed acid, are mixed thoroughly together in a continuous stream keeping the low temperature constant, and the reaction mixture is conducted down the reaction chamber in a continuous stream.

Working continuously, the amount of the starch added and the amount of the mixed acid added and further the removal of the reaction mixture can be accurately regulated, so that it is possible to allow the reaction ingredients to enter the reaction chamber in correct proportions and in relation to the size of the reaction chamber to allow them to act together for a correct period of time. The added concentrated mixed acid mixes in the reaction chamber immediately and continuously with the spent acid formed, which in consequence of the reaction has an altered composition. Consequently, the entire mass of the starch, which is introduced during the nitration into the reaction chamber, comes into contact during the entire time required in the reaction chamber with an acid of practically constant composition. The nitration is consequently uniform and every starch particle has to a very large extent the same content of nitrogen. The extraordinarily uniformly nitrated starch so obtained is very easily stabilized and is suitable for the preparation of explosives of the highest quality. The advantages of continuous nitration will be apparent by a comparison with nitration processes worked in batches.

With batch nitration the composition of the acid alters progressively in the course of the nitration. The starch added to the nitrating mixture at the beginning comes into contact with the most concentrated acid and a highly nitrated product is produced, that is to say, a product of high nitrogen content. During the reaction a part of the nitric acid is used up and water is formed. The acid is progressively diluted so that it has continually a different composition and forms a product with a correspondingly lower nitrogen content. The nitrated product consists therefore of a mixture of starch particles which are nitrated to a different degree. This condition is, however, highly undesirable in the final product. In order to reduce the alteration in the concentration of the nitrating acid during the reaction to the lowest possible degree a large excess of acid is employed in the batch method. The employment of a large excess of acid is, however, not commercial, and under these circumstances the filtering properties of the product are adversely affected.

By working continuously in accordance with the invention the above-mentioned disadvantages are avoided and with relatively small amounts of acid an extraordinary uniformly nitrated product may be commercially produced. In carrying out the process according to the invention the apparatus, for example as shown in the drawing, may conveniently be used.

Figure 2:
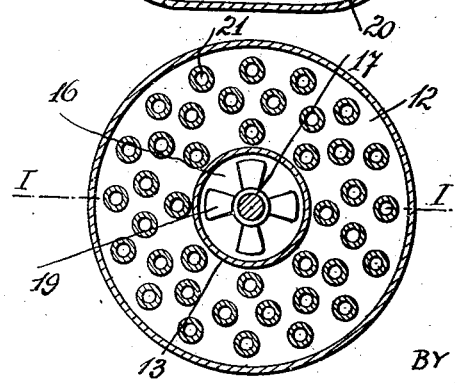

In the drawing Fig. 1 shows the nitration apparatus in longitudinal section on the line I—I of Fig. 2 which is a plan section of the nitration apparatus on the line II—II of Fig. 1.

In the vessel 10 which is made of acid-resisting material are two parallel plates 11 and 12 which enclose with the walls of the vessel 10 and the cylinder casing 13, a cylindrical space for containing the cooling liquid. Into this cylindrical space the cooling liquid is conducted through the pipe 14 and from which it is conducted by means of the pipe 15. In the interior 16 of the cylinder 13, the shaft 17 extends which is driven by the motor 18 and which is provided at the end which reaches into the cylindrical space 16 with propeller arms 19. In the nitration apparatus the cooled mixed acid from the container 24 and powdered starch from the container 25 are conducted into the space 22 by means of the pipes 26 and 27 respectively. In the space the two materials are continuously agitated by means of the propeller in the direction of the arrow. Meanwhile the mixture flows from the space 20 over the tubes 21 fixed in the plates 11 and 12 back to the space 22, and are thoroughly cooled by bringing them into contact with extended cooling surfaces. The nitrated material passes out at 23.

The propeller is preferably driven at a high rotation, for example, 1,000 to 1,500 revolutions per minute. By this means the starch and the acid are intimately mixed the one with the other, so that in the apparatus a uniform pulp-like mass is formed. In consequence of the large number of revolutions of the propeller, the mass is moved along the entire cooling surface with sufficient velocity. By this means the rapid and uniform mixing of the acid and the starch is achieved and the cooling of the mass ensures nitration without decomposition of the material.

*Example*

The ordinary grain starch obtained in the trade is ground to fine powder, dried and used in the air-dry condition for nitration. In the nitration apparatus the starch is conducted through the feeding device 25 driven by the electric motor 18. Simultaneously, the mixed acid flows from the container 24 into the nitrating vessel which contains 80% $HNO_3$ and 20% $H_2SO_4$. This mixed acid is received into the vessel in continuous circulation so that the starch falling into the mixed acid mixes thoroughly with this. The temperature of the mixed acid conducted to the apparatus is about minus 5° C. and the starch and the mixed acid are so conducted into the apparatus that the ratio of their amounts in the apparatus comes to 1:4.5. The heat of the reaction set free in the nitration vessel is conducted away by the cooling means which circulate in the cooling casings so that the temperature during the nitration is in the neighbourhood of minus 5° C. The reaction mixture flows out of the nitration vessel in an amount corresponding approximately to the amount of the starch and mixed acid conducted into the apparatus.

The reaction chamber of the apparatus is so dimensioned, and the amount of acid and starch conducted into the apparatus is so determined that the entire amount of reaction mixture present in the apparatus is renewed in about half an hour. This time is sufficient for the purpose of carrying out fully the nitration. As, however, the inflowing and outflowing go on continuously, it can happen that a few starch particles may leave the nitration apparatus before the expiration of this time. On this account in order to ensure uniform and complete nitration, the reaction mixture which flows out at 23 is submitted to a further nitration. This further nitration is carried out in an apparatus similar to that above described, consisting of a vessel with mixing device and cooling device in which the temperature of the reaction is maintained also at about minus 5° C. and the reaction product is thoroughly stirred. The reaction mixture leaves this apparatus in which the further nitration takes place also by overflowing. The overflow mixture is separated from the acid in known manner, washed, stabilized and worked up into gun powder or explosives.

Working in accordance with the example given, a nitro-starch is obtained containing 12.8% nitrogen and the yield reckoned on dry starch comes to 168%.

The hygroscopic measurement of the nitro-starch prepared according to this process is at least the same as that of nitro-cellulose with the same nitrogen content.

The nitro-starch prepared according to the invention has a far-reaching uniform nitrogen content, and the stability of gun powders or explosives prepared therefrom is the same as that of nitro-cellulose products with the corresponding nitrogen content.

We claim:
1. A process for the nitration of starch which comprises mixing together dry powdered starch and nitrating acid containing 70 to 90% nitric acid, and maintaining the temperature during the mixing operation and until the end of the re-action below plus 5° C.

2. A process for the nitration of starch which comprises mixing together dry powdered starch and nitrating acid containing 75 to 85% nitric acid and 15 to 25% sulphuric acid, and maintaining the temperature during the mixing operation and until the end of the re-action at about —5° C.

3. A process for the nitration of starch which comprises mixing together one part by weight of dry powdered starch and four to six parts by weight of nitrating acid containing 70 to 90% nitric acid, and maintaining the temperature during mixing operation and until the end of the re-action below plus 5° C.

4. A process for nitrating starch in which a stream of the dry powdered starch is brought together with a stream of the nitrating mixture containing 70%–90% nitric acid, and the temperature of the mixture is maintained below 5° C. and the reaction mixture is assembled in a cooled space for the purpose of completing the nitration wherein the nitrating mixture is agitated and its temperature maintained below 5° C. and finally, the nitro starch is separated from the acid in known manner.

ALFONS KUNZ.
JOHANN HELLE.